(12) United States Patent
Shi et al.

(10) Patent No.: US 9,092,509 B2
(45) Date of Patent: Jul. 28, 2015

(54) SEARCH QUERY USER INTERFACE

(71) Applicant: Microsoft Corporation, Redmond, WA (US)

(72) Inventors: Shuming Shi, Beijing (CN); Chin-Yew Lin, Beijing (CN); Yunbo Cao, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/680,864

(22) Filed: Nov. 19, 2012

(65) Prior Publication Data

US 2014/0143223 A1     May 22, 2014

(51) Int. Cl.
    *G06F 17/30*           (2006.01)

(52) U.S. Cl.
CPC ...... *G06F 17/3064* (2013.01); *G06F 17/30634* (2013.01)

(58) Field of Classification Search
CPC .......... G06F 17/30796; G06F 17/3082; G06F 17/30864; G06F 17/3084
See application file for complete search history.

(56) References Cited

U.S. PATENT DOCUMENTS

| | | | |
|---|---|---|---|
| 7,051,023 B2 | 5/2006 | Kapur et al. | |
| 7,152,064 B2 | 12/2006 | Bourdoncle et al. | |
| 7,676,460 B2 | 3/2010 | Morgan | |
| 7,747,639 B2 | 6/2010 | Kasperski et al. | |
| 7,917,528 B1 | 3/2011 | Dave et al. | |
| 8,275,786 B1* | 9/2012 | Dave et al. | 707/766 |
| 8,332,393 B2* | 12/2012 | Elyada | 707/722 |
| 8,756,503 B2* | 6/2014 | Privault et al. | 715/702 |
| 2006/0122979 A1 | 6/2006 | Kapur et al. | |
| 2007/0038621 A1* | 2/2007 | Weyand et al. | 707/5 |
| 2007/0061244 A1* | 3/2007 | Ramer et al. | 705/37 |
| 2007/0061317 A1 | 3/2007 | Ramer et al. | |
| 2007/0162422 A1 | 7/2007 | Djabarov | |
| 2008/0208567 A1* | 8/2008 | Brockett et al. | 704/9 |
| 2008/0250012 A1* | 10/2008 | Hinckley et al. | 707/5 |
| 2010/0088295 A1* | 4/2010 | Duan et al. | 707/705 |
| 2011/0035406 A1* | 2/2011 | Petrou et al. | 707/769 |
| 2011/0043652 A1* | 2/2011 | King et al. | 348/222.1 |
| 2011/0131241 A1* | 6/2011 | Petrou et al. | 707/770 |
| 2011/0202874 A1* | 8/2011 | Ramer et al. | 715/810 |
| 2011/0270824 A1* | 11/2011 | Morris et al. | 707/722 |
| 2012/0294520 A1* | 11/2012 | Mei et al. | 382/164 |

OTHER PUBLICATIONS

Jones t al, "Generating Query Substitutions", May 23-26, 2006, ACM, pp. 387-396.*

(Continued)

*Primary Examiner* — Angelica Ruiz
(74) *Attorney, Agent, or Firm* — Micky Minhas; Lee & Hayes PLLC (57) ABSTRACT

This disclosure describes, in part, techniques for operating a search query user interface to allow seamless creating, editing and/or refining of a search query using various interactive functions. The techniques described herein may display a search query divided into segments. A selection of a segment of the search query may then be received. One or more alternatives to the selected segment may then be presented. Next, a selection of one of the presented alternative may be received. As a result, the search query may be altered using the selected alternative. Furthermore, the techniques described herein allow a user to operate on a search query using query substitution, expansion, association and/or history functions.

20 Claims, 9 Drawing Sheets

(56) References Cited

OTHER PUBLICATIONS

Tan, et al. "Unsupervised Query Segmentation Using Generative Language Models and Wikipedia", WWW 2008, Refereed Track: Search—Query Analysis, Apr. 21-25, 2008, 10 pages.

The 2nd PCT Written Opinion mailed Nov. 17, 2014 for PCT application No. PCT/US2013/070614, 8 pages.

"International Search Report & Written Opinion for PCT Application No. PCT/US2013/070614", Mailed Date: Jun. 23, 2014, Filed Date: Nov. 18, 2013, 10 pages.

* cited by examiner

SEARCH QUERY USER INTERFACE

BACKGROUND

As electronic devices become a greater part of daily life and the amount of content on the Web continues to increase, the amount of time people spend using electronic devices to search for information on the Web continues to rise. For instance, users now regularly use their desktop computers and, more and more, their mobile electronic devices utilizing touch technology (e.g., smart phones, tablet computing devices, etc.) to access a search engine to find information on the Web. As the amount of these searches continues to increase, enhancing the experience of users engaging in these searches on their mobile electronic devices while reducing the amount of time the users spend executing these searches remains a priority.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

This disclosure describes an interactive user interface that allows a user to create or alter a search query using various interactive operations. The user interface displayed on a computing device may include two sections: a query builder section; and a search results section. In the query builder section, a search query may be initially input by the user and automatically parsed for display in a segmented fashion. In one example, the search query may be segmented into groups of related words. Thus, the input search query, "vincent van gogh starry night" may be segmented as "[vincent van gogh] [starry night]." Each segment may contain one or more words, which may be delimited by brackets, separated by an arrow (e.g., "▲"), or otherwise indicated. Interactive functions, operations and/or tools may allow the user to alter or replace one or more segments in the search query. The interactive functions may be controlled by touch gestures, which change the initially input search query without requiring the user to type the changes into the search query. Once the user settles on a desired altered search query, the altered search query is sent to one or more search engines and/or databases. Search results from the one or more search engines and/or databases may be displayed in the search results section of the user interface.

A query substitution function may be presented to allow the user to replace a selected segment of the search query. In one example by which a segment may be replaced, the user may first select a segment of the search query. Continuing the "[vincent van gogh] [starry night]" example above, the user may select the segment "[starry night]" of the search query. In response, one or more alternatives to the selected segment may be presented to the user within the query builder section of the user interface. For example, other paintings by Vincent Van Gogh, such as "[sunflowers]" may be presented to the user. The alternatives to the selected segment "[starry night]" may be obtained from a knowledge base determining, due to their high correlation with the selected segment, which may be evaluated based in part on one or more of the remaining unselected segments (in this case "[vincent van gogh]").

Selection of the query substitution function may cause presentation of one or more tools to allow the user to merge one or more words in an adjacent segment of the search query with the selected segment of the search query. Additionally or alternatively, the tools may allow the user to split the selected segment of the search query into multiple portions or segments. The tools may allow the user to delete the selected segment from the search query.

A query expansion function may be presented to allow the user to add an alternative segment before and/or after the selected segment of the search query. The query expansion function may present one or more suggested alternative segment(s) that the user may select to add before and/or after the selected segment of the search query.

Selection of the query expansion function may cause presentation of a prefix/suffix input field. The prefix/suffix input field may allow the user to input a prefix and/or suffix to create a refined search query.

A query association function may be presented to allow the user to replace the entire input search query. The query association function may provide one or more alternative search queries, where the alternative search queries are associated with, or related to, the input search query. For example, the user may initially input a search query of "Bill Gates." Upon selection of the query association function, the user may be presented with one or more alternative search queries, such as "Microsoft", "Steve Jobs", "Mark Zuckerberg", "Philanthropist" and the like. The user may select one of these alternative or associated search queries to replace the initially input search query, here "Bill Gates", without the need for the user to manually input the alternative search query.

Selection of the query association function may cause presentation of a query association input field. The query association input field may allow the user to input an alternative search query that may be associated with the input search query.

A query history function may also be presented as an interactive operation within the query builder section of the user interface. The query history function may present previous search queries to the user that contains a selected segment of the input search query. For example, the user may enter an initial search query of "weather in seattle," which may be displayed in segments as "[weather] [in] [seattle]." User selection of the segment "[weather]", for example, may cause the display of previous search queries using the selected segment, here "[weather]". The presented previously searched queries may include "weather of beijing", "weather vane" or "weather". Thus, the user is able to conveniently repeat prior searches.

A search engine selection function may allow the user to modify or select which search engine or combination of search engines executes the search of the search query. For example, once the user decides on an alternative search query or is satisfied with the initially input search query, the user may select to send the desired search query to a particular or favorite search engine. For example, the user may select the operation that sends the search query to a single commercially available browser such as Bing® from Microsoft Corporation in Redmond, Wash. or Google® from Google in Mountain View, Calif. The query builder section may allow the user to send the desired search query to multiple search engines or execute a metasearch. For example, the user may desire to have the search query executed in two or more search engines such as Bing® and Google®, which may allow the user to compare the search results. The search engine selection function may additionally or alternatively allow the user to send the desired search query to one or more ecommerce merchant databases such as those operated by Amazon® or eBay®. Furthermore, the search engine selection function may allow the user to send the search query to other web base databases or information sites such as Wikipedia®, IMDb®, WebMD®, or the like.

It should be understood that each of the operations described above, and throughout this application, are operations that may be initiated by the user with the touch of a finger, stylus, voice technology, a mouse, or the like.

The techniques for providing an interactive user interface to allow the user to alter a search query using various interactive operations may be implemented in many ways. Example techniques are provided below with reference to the figures.

Example System

Figure 1:
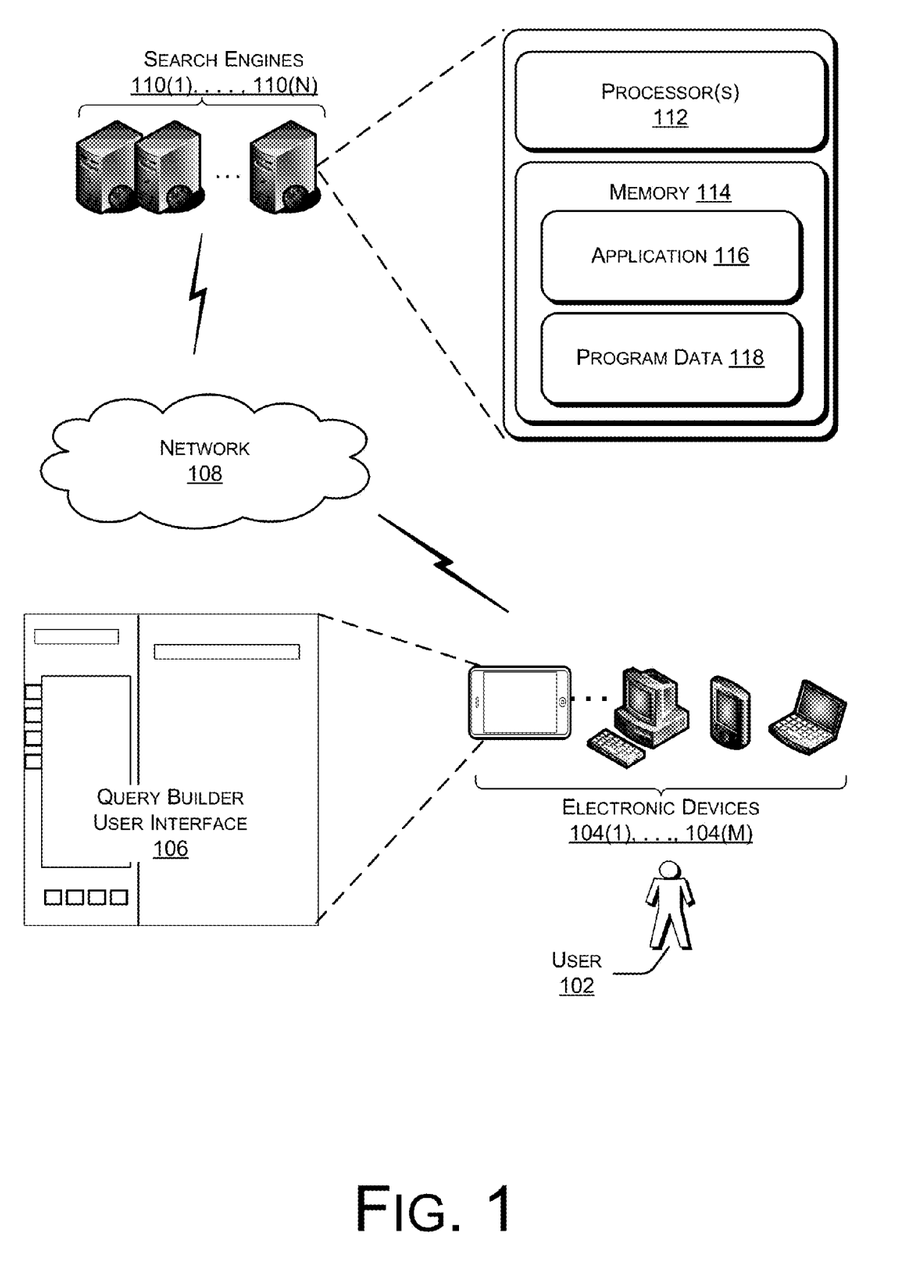
FIG. 1 illustrates an example environment where a user may utilize the search query user interface on an electronic device over a network to access one or more search engines.

FIG. 1. illustrates an example environment or architecture 100 for providing an interactive user interface for allowing a user to alter a search query using various interactive functions, operations and/or tools. As illustrated, the environment 100 interacts with a user 102 who operates one or more of electronic device(s) 104(1), . . . , 104(M). The electronic devices 104(1)-(M) may include one or more of a personal computer, mobile phone, laptop computer and tablet computing device, or other device(s). As described below, the electronic devices 104(1)-(M) are equipped with one or more processors and memory to store applications and data. One or more browsers or other client applications may be stored in the memory and may execute on the processor(s) to operate and provide access to a query builder user interface 106.

Each electronic device 104(1)-(M) may be configured to connect to network 108 to access one or more search engine(s) 110(1), . . . , 110(N). Network 108 may be any type of communication network, including the Internet, a local area network, a wide area network, a wireless area network, a wireless network, or the like, including combinations of the foregoing.

In some implementations, each search engine 110(1)-(N) may contain processor 112 and memory 114. As illustrated, memory 114 includes an application 116 and program data 118 as required to implement searching and other functionality.

Example User Device

Figure 2:
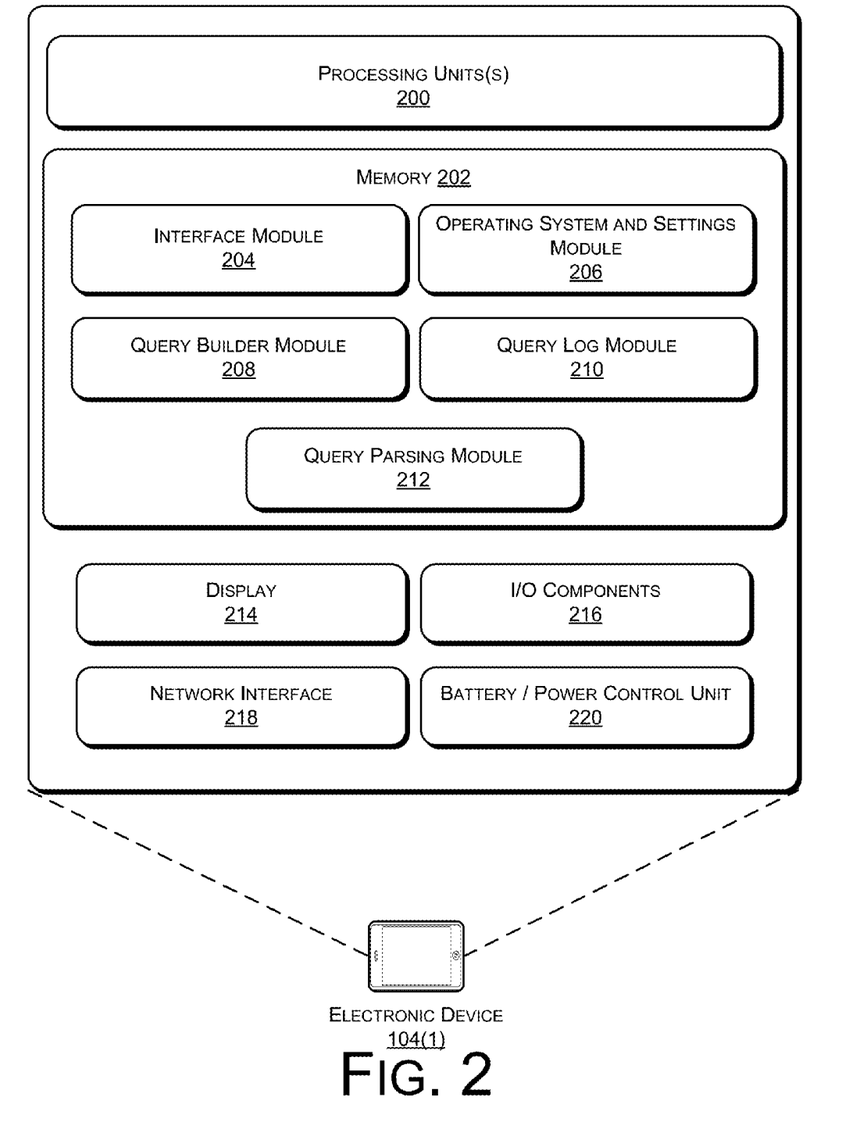
FIG. 2 illustrates example components of a device that may utilize the search query user interface.

FIG. 2 illustrates example components that might be implemented in electronic device 104(1) of FIG. 1 to display the interactive query builder user interface 106. In this example, the device is shown as a tablet computing device, however other electronic devices may implement these techniques and may include some or all of the functionality described herein.

Device 104(1) may include one or more processing units 200 and memory 202. The memory 202 may be used to store any number of functional components that are executable by the processing unit(s) 200, as well as data and content items that are rendered by device 104(1). Depending on the configuration of the device 104(1), the memory 202 (and other memories described throughout this document) is an example of computer-readable media.

Computer-readable media, as the term is used herein, includes, at least, two types of computer-readable media, namely computer storage media and communications media. Computer storage media includes volatile and nonvolatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium that can be used to store information for access by a computing device.

In contrast, communication media may embody computer readable instructions, data structures, program modules, or other data in a modulated data signal, such as a carrier wave. As defined herein, computer storage media does not include communications media.

An interface module 204 may be provided in memory 202 and may be executed on the processing unit(s) 200 to provide a user interface to assist the user operation of device 104(1). The interface module 204 may allow tactile entry of requests (e.g., via touchscreen or touchpad, etc.), textual entry of requests (e.g., via a cursor, controller, keyboard, etc.), audible entry of requests (e.g., via a microphone), or entry of requests in any other manner.

An operating system and settings module 206 provides an operating system and a plurality of user settings to allow personalization of device 104(1) to the user. The operating system and setting module 206 may be provided in memory 202 and executed on the processing unit(s) 200. Example settings stored in the setting module 206 may include device registration, device name, Wi-Fi settings, device password, and the like.

A query builder module 208 may also be provided in memory 202 and may be executed on the processing unit(s) 200 to enable a user to create, edit and/or alter a search query. For example, as described below in greater detail, the query builder module 208 may enable the user to access query functions, such as functions for query substitution, expansion, association and history.

A query log module 210 may also be provided in memory 202 and may be executed on the processing unit(s) 200 to store previously searched queries, including data describing the number of times the search has been sent, and/or the date and time sent and other related data.

A query parsing module 212 may also be provided in memory 202 and may be executed on the processing unit(s) 200 to parse and/or segment a search query. For example, the query parsing module 212 may automatically segment a search query as the user inputs the search query into the interactive query builder user interface 106. In one example, the query parsing module 212 may parse the query "vincent van gogh starry night" into two segments "[vincent van gogh]" and "[starry night]" when the query is input by the user.

FIG. 2 further illustrates a display 214, which may support input from the user and output to the user. The display 214 may be embodied using technologies, such as LCDs and OLEDs, that provide output and accepts input. A touch sensitive input mechanism may be included with the display 214 to form a touch-screen display to allow the user to access features and functionality of the query builder user interface 106.

Various input/output (I/O) components 216 may include one or more user interface controls (e.g., buttons, a joystick, a keyboard, etc.), a camera, a bar code reader, audio speakers, a microphone, connection ports, and so forth.

A network interface 218 may support both wired and wireless connection to one or more networks, such as the Internet, cellular networks, Wi-Fi networks, LAN, and so forth. The device 104(1) may include a battery and power control unit 220. The battery and power control unit provides and/or controls power or electrical energy provided to and/or consumed by the device.

The device 104(1) may have additional structures, features and/or functionality. For example, the device 104(1) may also include additional data storage devices (removable and/or non-removable) such as magnetic disks, optical disks, or solid state devices, etc. The additional data storage media may include volatile and nonvolatile, removable and non-removable media implemented in any method or technology for storage of information, such as computer-readable instructions, data structures, program modules, or other data.

Example User Interfaces

Figure 3:
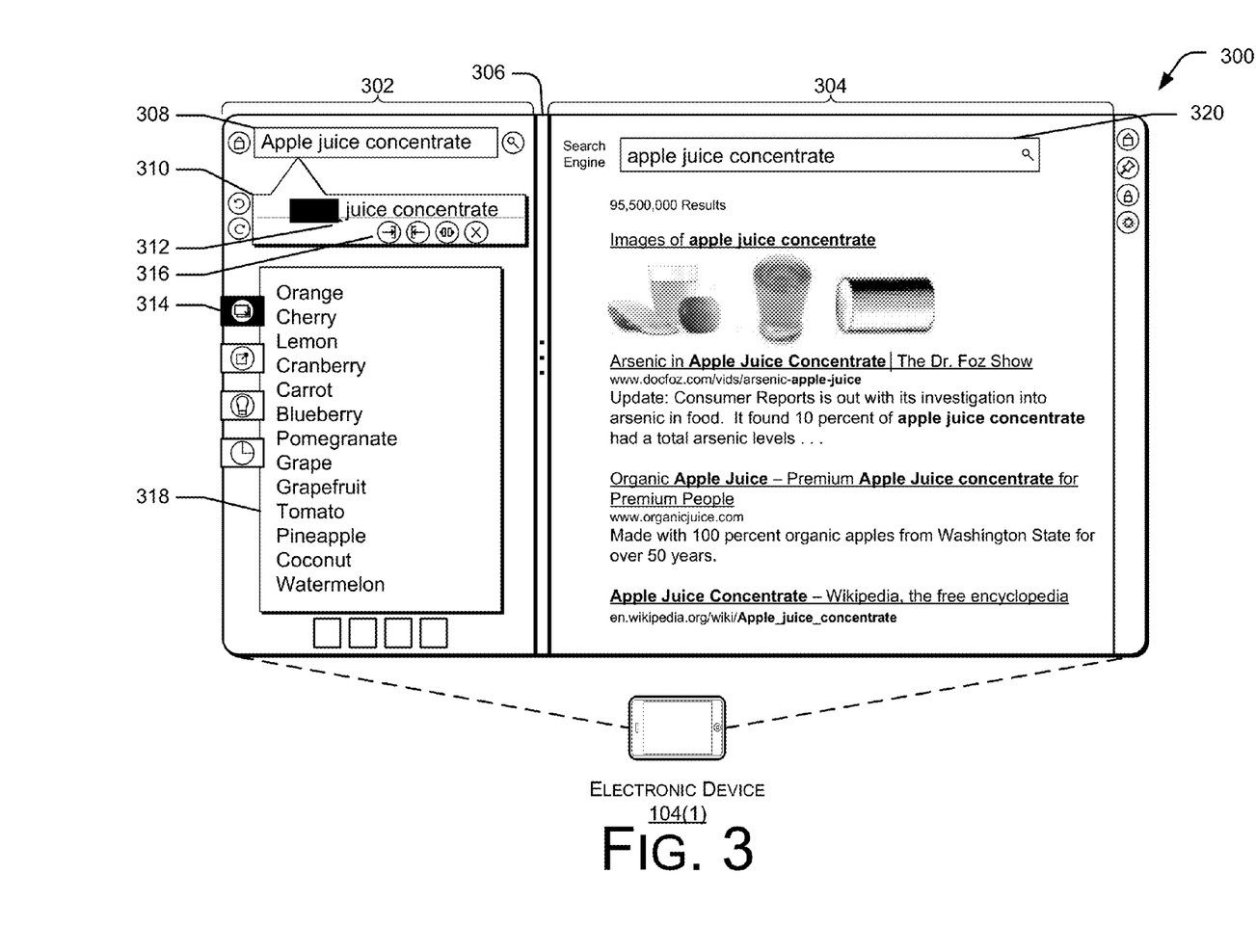
FIG. 3 illustrates an example interactive user interface (UI) displaying a query builder section, a search result section, and a query substitution function on an electronic device.

FIGS. 3-7 illustrate example user interfaces that may be displayed on electronic device 104(1). FIG. 3 shows an example interactive user interface 300 displayed on electronic device 104(1) which may be implemented by the interface module 204 and/or the query builder module 208 (see FIG. 2). The interactive user interface may contain two sections: a query builder section 302; and a search results section 304. The query builder section 302 and the search results section 304 may be divided by an adjustable separation bar 306. The adjustable separation bar 306 may allow the user to increase or decrease the relative size of each section of the interactive user interface 300. This may be accomplished by a "click and drag" or "touch and drag" method where the user clicks or touches separation bar 306 to drag it to a new desired location. The separation bar 306 may have certain preset positions. For example the query builder section 302 may be displayed on ⅓ of the interactive user interface 300 and the search results section 304 may be displayed on the remaining ⅔ of the interactive user interface. Alternatively, the query builder section 302 and the search results section 304 may be displayed using alternative proportions.

The query builder section 302 may include a query input box 308 where the user may input an initial search query, such as by typing or voice-to-text. Once the initial query is received in query input box 308, it may be automatically segmented (e.g., by the query parsing module 212 of FIG. 2) and displayed in a segmented search query box 310. As illustrated, the user inputted the text "Apple juice concentrate" within the query input box 308. Within the segmented search query box 310, a segmentation arrow 312 shown as "▲" (or alternatively, brackets) separates the segments within the search query. The segmentation arrow 312 indicates a division between each segment of the user input text. As illustrated in FIG. 3, the segmentation arrow 312 appears between the words "apple" and "juice concentrate" in the segmented search query box 310 to indicate that there are two segments of the inputted text query "Apple juice concentrate".

FIG. 3 illustrates aspects of a query substitution function 314 that may be used to allow the user to create a refined search query by substituting an alternative word or phrase for one or more segments of the input search query. The query substitution function 314 is shown in gray as a result of the selection of this function by the user. The selection of the query substitution function 314 may be indicated in other manners. For example, the query substitution function 314 may appear as bold or highlighted in response to its selection.

The query substitution function 314 may generate alternative words, phrases and/or terms for presentation to the user. FIG. 3 illustrates that the user has selected a segment of the search query corresponding to the word "apple," which is displayed in the segmented search query box 310. The selection of the segment of the search query may result in altering the appearance of the selected segment in a variety of ways, such as highlighting, displaying the text in bold, or the like. The selection of the segment may result in the display of alternative or "substitute" words or terms within substitution box 318. The query substitution function 314 may generate the alternative words or terms for display within substitution box 318 by using new or existing search technology. In one example, a knowledge base may be utilized by the query substitution function 314 to generate the alternative words or terms displayed within substitution box 318. The knowledge base may select the alternative words or terms based in part on one or more of the remaining unselected segments. As illustrated in FIG. 3, the alternative words for the selected segment of the search query "apple" that are displayed within substitution box 318 are "Orange", "Cherry", "Lemon", etc. These alternative words are based in part on the unselected segment "juice concentrate".

In an alternative example, if the search query was "[apple] [CEO]", and the unselected segment was "[CEO]", the alternatives to the segment "[apple]" displayed in substitution box 318 might be "Microsoft", "Facebook", "HP", "Dell" or the like. In this example, the unselected segment "[CEO]" indicates that the selected segment (i.e., "apple") should be interpreted as a corporation. Thus, alternative words with a similar interpretation such as "Microsoft", "Facebook", "HP", and "Dell" are deemed to be related to the selected segment "[apple]".

In the example shown in FIG. 3, the user may select one of the alternative words or terms displayed within substitution box 318 to replace or substitute for the selected segment of the search query displayed in the segmented search query box 310. For example, the user may select the alternative word "Orange" displayed within substitution box 318. As a result, the selected segment of the search query (i.e., "apple") would be replaced with the alternative word "orange". Thus, the user interface 300 allows the user to create a new or refined search query "orange juice concentrate" without the need to manually input the new or refined search query. The user interface 300 may then display the refined search query in search engine box 320 for transmission to one or more search engines. The results of the search request may be displayed in the search results section 304.

One or more icons or indicia representing one or more tools 316 may appear within the segmented search query box 310 after receiving the selection of the query substitution function 314. The one or more tools 316 may allow the user to change or alter the initial query segmentation, such as by operating on, or altering the position of the segmentation arrow 312. Furthermore, the one or more tools 316 may allow the user to merge or combine segments of the search query to split or divide existing segments of the search query, and/or to delete segments of the search query.

Segment merge tools may allow the user to merge or combine two or more segments of the search query. The segment merge tools may allow the user to merge a selected segment with an adjacent segment. Thus, the segment merge tools may comprise two tools allowing a user to merge a selected segment with a segment immediately to the right and/or to the left of the selected segment. As shown in FIG. 3, the initial search query "apple juice concentrate" is segmented into two segments "[apple]" and "[juice concentrate]". The segment merge tools may allow the user to combine the segment "[apple]" and the segment "[juice concentrate]" to create a new segment "[apple juice concentrate]". Creating the new segment may result in an update or refresh of the alternative words and/or terms generated by the query substitution function 314 and displayed within substitution box 318 as described above.

A segment split tool may allow the user to split or divide one or more segments of the search query, where the one or more segment to be split contains two or more words. Continuing the example illustrated in FIG. 3, the segment split tool may allow the user to split the segment "[juice concentrate]" into two separate segments "[juice]" and "[concentrate]".

A segment delete tool may allow the user to delete or remove one or more selected segments of the search query. As illustrated in the example of FIG. 3, upon selection of the segment "[apple]", the user may utilize the segment delete tool to remove the segment "[apple]" from the search query displayed in the segmented search query box 310. Thus, the search query is refined to "[juice concentrate]". It should be understood that this refined search query may be automatically segmented (e.g., by the query parsing module 212 of FIG. 2) and displayed in the segmented search query box 310. Furthermore, the alternative words, phrases and/or terms generated by the query substitution function 314 and displayed within substitution box 318 may be updated or refreshed to reflect the refined search query "[juice concentrate]".

The number of tools presented may be dependent on the number of words in a segment and/or the number of segments in the search query. For example, the segment split tool may only be displayed where the selected segment contain two or more words.

Figure 4:
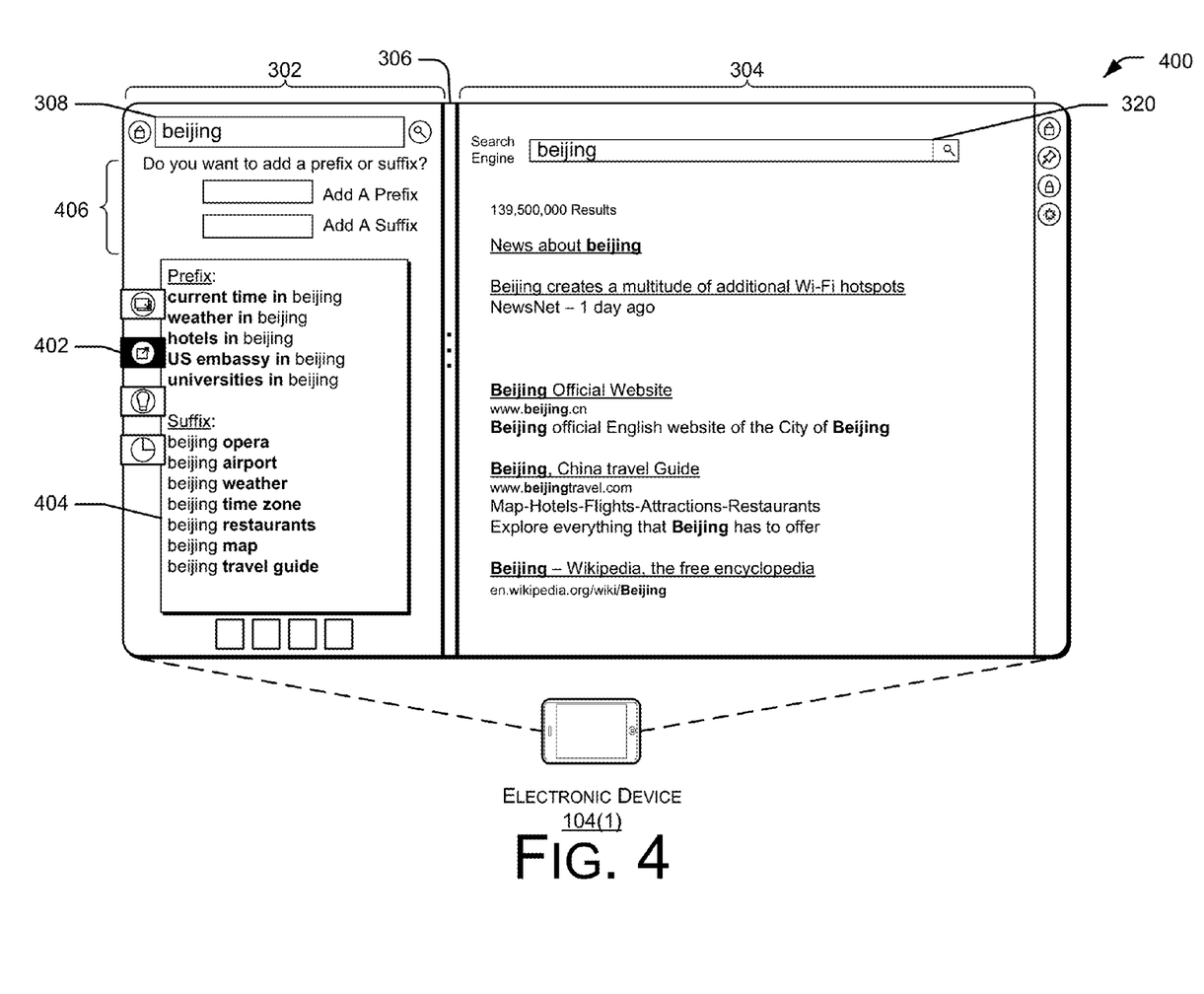
FIG. 4 illustrates another example UI displaying a query expansion function on an electronic device.

FIG. 4 illustrates aspects of a query expansion function 402 that may be used to allow the user to add one or more segments before and/or after the input search query. As illustrated, the user interface 400 contains the query builder section 302 and the search results section 304 divided by an adjustable separation bar 306. Similar to FIG. 3, the query builder section 302 includes a query input box 308 where user may input an initial search query. For example, the user may input the text "Beijing" within the query input box 308.

After the input of the initial search query in query input box 308 and selection of the query expansion function 402, the user interface 400 may display suggested words and/or phrases within expansion box 404. The suggested words and/or phrases within expansion box 404 are words and/or phrases that the user may select to place either before or after the input search query or selected search query segment displayed in query input box 308. Expansion box 404 may contain a list of prefix words or phrases to place before the input search query displayed in query input box 308 and/or a list of suffix words or phrases to place after the input search query displayed in query input box 308. In either case, the addition of the suggested words and/or phrases alters the input search query to create a refined search query, which may include one or more additional segments.

The display of suggested words and/or phrases within expansion box 404 may be generated using new or existing search technology. The display of suggested words and/or phrases within expansion box 404 may be generating using a query log that records a user's search history within the query builder module 208 (see FIG. 2). Each logged entry within the query log may then be ranked based on the number of times the user has utilized the suggested words and/or phrases. The entries with the highest rank may be displayed as the suggested words and/or phrases within expansion box 404.

The query expansion function 402 may be selected by, for example, a touch of the user's finger, stylus, or the like. Once the query expansion function 402 is selected, the user interface 400 may display the prefix/suffix input section 406 within the query builder section 302. The prefix/suffix input section 406 may allow the user to input a desired word or phrase to place either before (prefix) or after (suffix) the input search query displayed in query input box 308 to create a refined search query to be displayed in search engine box 320 of the search results section 304.

Upon review of the expansion box 404, the user may desire to add a prefix before and/or a suffix after to the input search query displayed in query input box 308. This may be done by receiving input from the user of the desired words and/or phrases for display in the prefix/suffix input section 406. Additionally or alternatively, the user may select one or both of a prefix and suffix displayed within expansion box 404.

Figure 5:
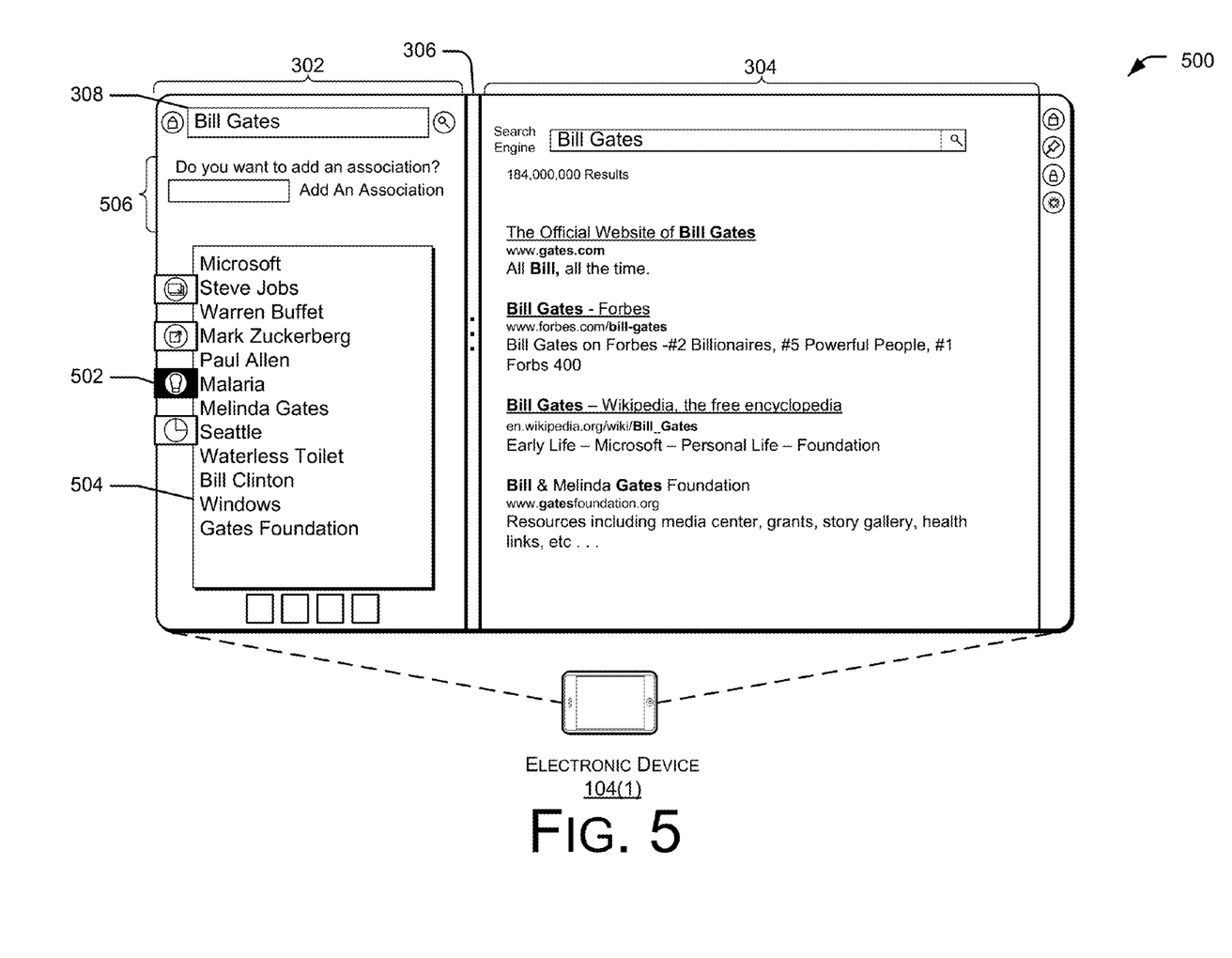
FIG. 5 illustrates another example UI displaying a query association function on an electronic device.

FIG. 5 illustrates an example of a query association function 502 that may allow a user to replace the search query with a new related or "associated" search query without the need to input the new associated search query. Similar to FIGS. 3 and 4, the user interface 500 contains the query builder section 302 and the search results section 304 divided by an adjustable separation bar 306. A query input box 308 may be provided for input of an initial search query. In the example of FIG. 5, the user has input the search query "Bill Gates" in the query input box 308.

Upon selection of the query association function 502, the user interface 500 may display alternative search queries within association box 504 that are determined to be associated with the entire input search query in query input box 308. In one example, alternative search queries may be obtained by operation of a knowledge base and/or query log module (e.g., query log module 210 of FIG. 2).

In contrast to the query substitution function 314, described with reference to FIG. 3 above, which allows a user to substitute alternative words or terms for a selected segment of the input search query, the query association function 502 allows the user to select an entire search query that is determined to be related or "associated" with the input search query. In the example of FIG. 5, when the user inputs the search query "Bill Gates" within the query input box 308 and selects the query association function 502, the user interface 500 displays alternative search queries that are associated with "Bill Gates". For example, the query association function 502 may provide "Microsoft", "Steve Jobs", "Windows", "Gates Foundation", "Warren Buffet" and so on, as alternative suggested search queries that are associated with "Bill Gates".

One of the alternative suggested search queries presented in association box 504 may be selected by the user. Subsequently, the user interface 500 may send a search request using the selected search query. The results of the search request may be displayed in the search results section 304.

Upon selection of the query association function 502, the user interface 500 may display an association input section 506. The association input section 506 allows the user to input a search query that is associated with the initially input search query. Subsequently, the user interface 500 may send a search request using the input search query. Furthermore, the user interface 500 may store the selected association search query in a knowledge base and/or query log module (e.g., query log module 210 of FIG. 2) for future use by the user interface 500.

Figure 6:
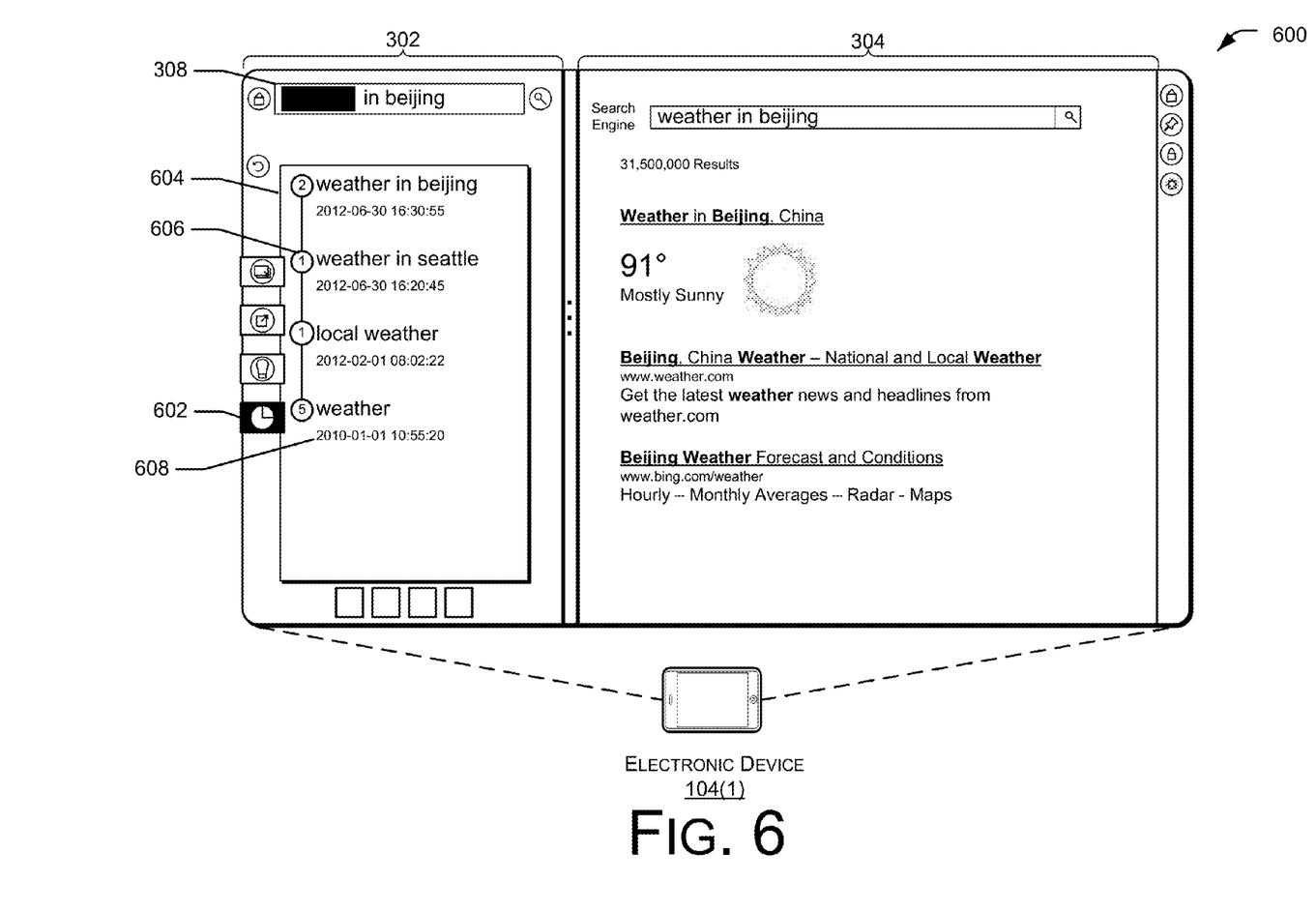
FIG. 6 illustrates another example UI displaying a query history function on an electronic device.

FIG. 6 illustrates an example of a query history function 602 that allows the user to select from among previous or historical search queries that include one or more segments in common with the input search query. The user interface 600 may contain the query builder section 302, the search results section 304, and a query input box 308 where user may input an initial search query.

The user may select the query history function 602 displayed in the user interface 600. Upon selection of the query history function, the user interface 600 displays search history box 604. For example, the user may input the initial search query "weather in beijing" in the query input box 308. The user may select a segment of the input search query. Continuing the example above, the user may highlight or select the segment of the input search query "weather".

Upon selection of the query history function 602, the search history box 604 may display previously searched queries stored in the query log module 210 that contain the selected segment of the input search query. For example, search history box 604 within user interface 600 displays previously search queries that contain the selected segment "weather".

Search history box 604 may display the number of times that the previously searched queries have been searched at 606. The search history box 604 of user interface 600 may additionally display the date and/or the time each of the displayed previously search queries had been searched at 608.

The query history function 602 allows the user to select one of the previously searched queries displayed in search history box 604. In response to user selection, the user interface 600 may replace the initially input search query displayed in query input box 308 with the selected search query. Consequently, the user interface 600 may send a search request using the query displayed in the query input box 308 as updated with the selected previously searched query. The results of the search request may be displayed in the search results section 304.

Figure 7:
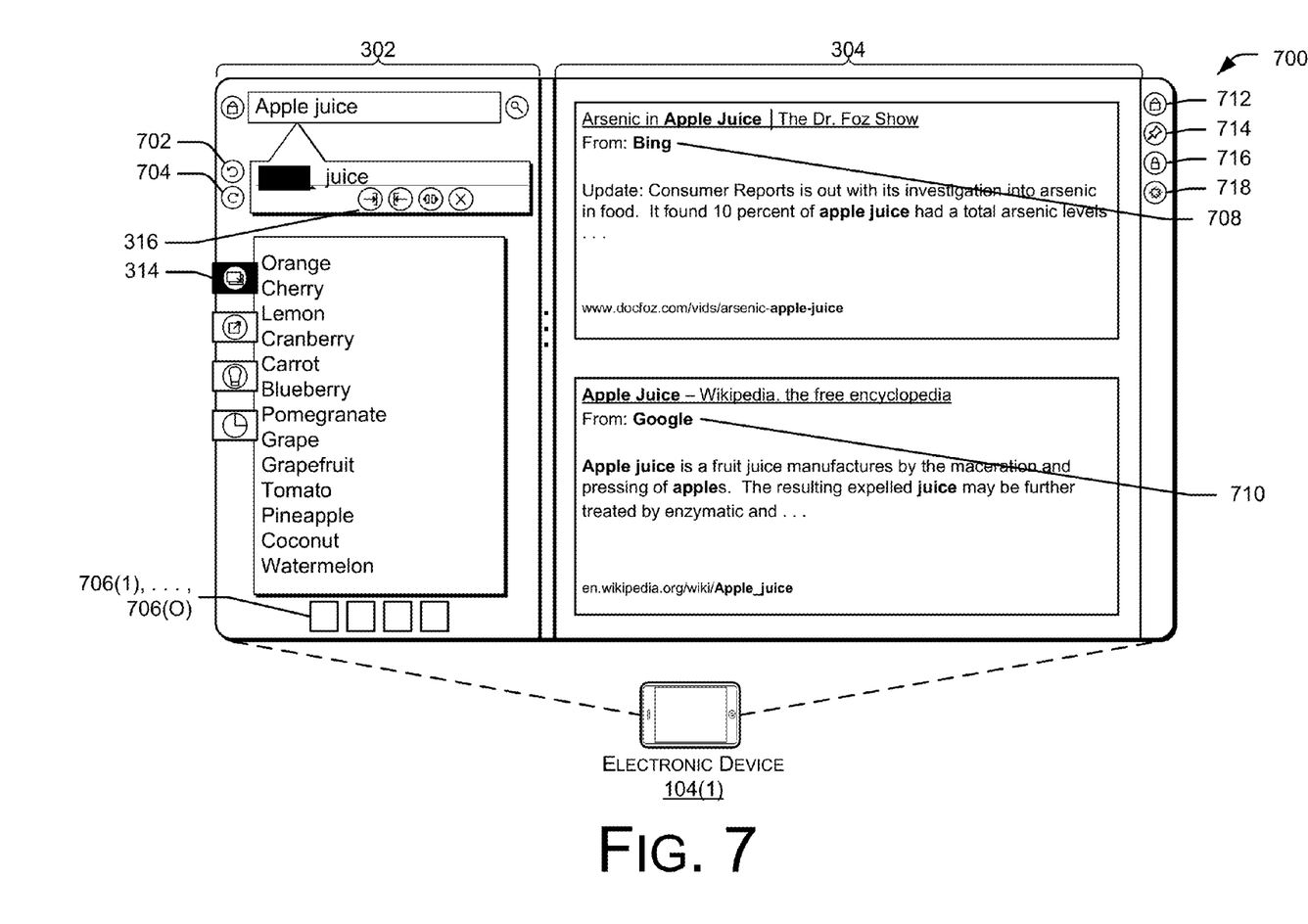
FIG. 7 illustrates another example UI displaying various tools that may be implemented in combination with one or more functions illustrated in FIGS. 3-6.

FIG. 7 illustrates example user interface 700 including various additional tools and/or functions that may aid the user in refining a search query. It should be noted that the tools and features described with reference to FIG. 7 may be included and implemented with any of the functions described in FIGS. 3-6 above.

As illustrated in FIG. 7, the user interface 700 may contain undo 702 or redo 704 functions or commands to allow the user to undo or redo an action. For example, the user using the segment merge tools 316 within the query substitution function 314 to merge or combine segments of the search query may wish to revert the segments of the search query to their position immediately prior to the user's action. The user may select the undo function 702. However, if the user reconsiders, the redo function 704 may be used.

User interface 700 may contain a search engine selection function 706(1)-(O) to allow the user to select or change the search engine(s) 110(1)-(N) to which the search request is sent. As illustrated in FIG. 7, user interface 700 contains search engine selection functions 706(1)-(O) within the query builder section 302. Each search engine selection function 706(1)-(O) may correspond to a separate search engine or a combination of multiple search engines to which the search request may to be sent.

Once the user is satisfied with the search query, the user may select to send the desired search query to a preferred or favorite search engine. For instance, the user may select the search engine selection function(s) 706(1)-(O) which may corresponds to the search engine Bing®. Additionally or alternatively, the user may select the search engine selection function(s) 706(1)-(O) which may correspond to multiple search engines. For example, the user may desire to execute a metasearch and have the search query sent to two or more search engines such as Bing® and Google®, which may allow the user to compare the search results. As illustrated in FIG. 7, search results section 304 may display the top search results for Bing® at 708 and Google® at 710. Additionally or alternatively, the search engine selection function 706(1)-(O) may allow the user to send the desired search query to one or more ecommerce merchant databases such as those operated Amazon® or eBay®. Furthermore, the search engine selection function 706(1)-(O) may allow the user to send the search query to other web-based databases such as Wikipedia®, IMDb®, WebMD®, or the like.

The query builder user interface 106 (see FIG. 1) may include a default search engine within the setting module 206 (see FIG. 2). If a search engine selection function 706(1)-(O) was not selected, the search request may be sent to the default search engine.

FIG. 7 also contains operations 712, 714, 716 and 718 within the right bar of user interface 700, which allows the user to manipulate the interactive user interface. Operation 712 allows the user to access the home page of an application using the query builder module 208. Operation 714 may permit the user to publish or share their search results via a blog post, social media, email or the like. Operation 716 allows the user to lock the search results. At operation 716, the user may lock the search result to prevent additional manipulation or alteration within the interactive user interface. Furthermore, operation 718 allows the user to access the setting module 206.

Example Processes

Figure 8:
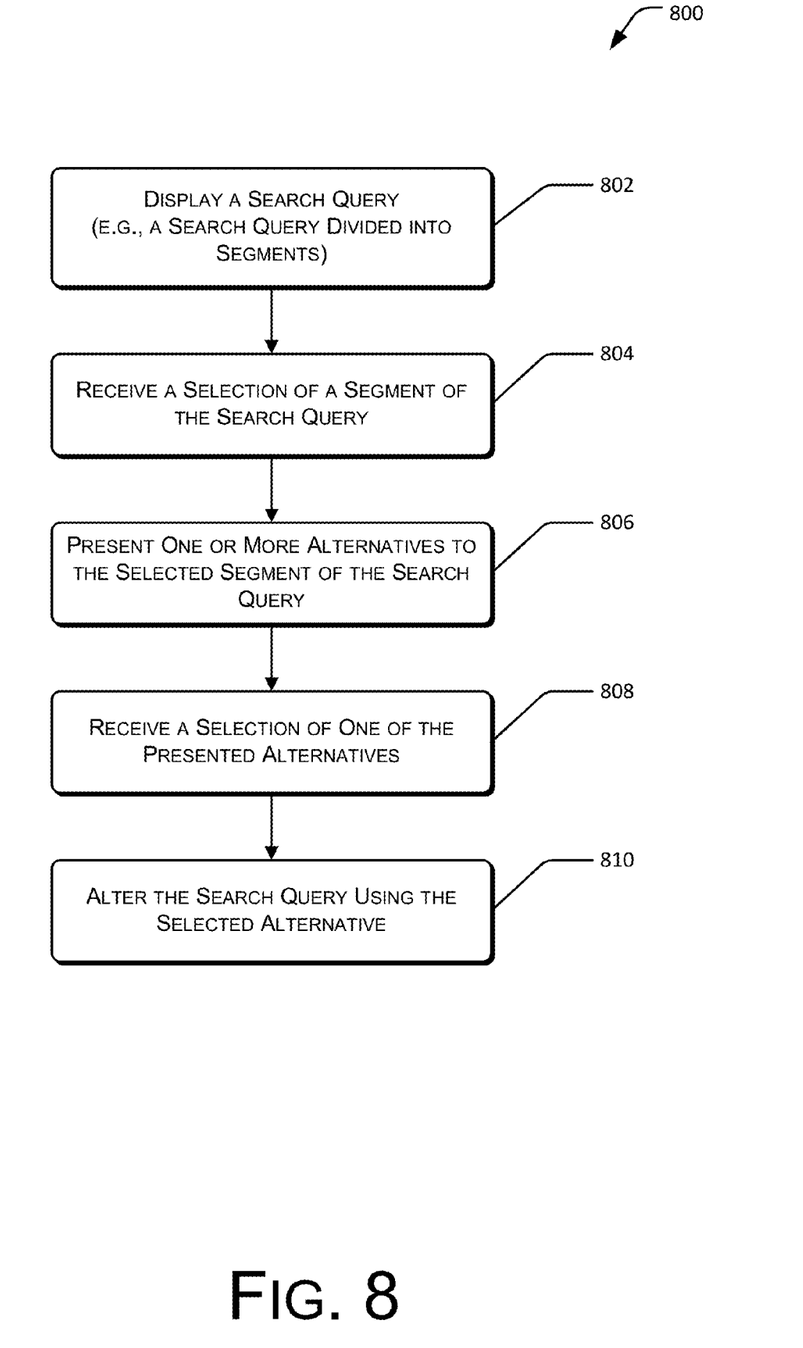
FIG. 8 is a flow diagram showing an example process for operating the search query user interface.

FIG. 8 illustrates an example process 800 for implementing the techniques described above for operating a search query user interface. The process 800 (as well as each process described herein) is illustrated as a logical flow graph, each operation of which represents a sequence of operations that can be implemented in hardware, software, or a combination thereof. In the context of software, the operations represent computer-executable instructions stored on one or more computer-readable media that, when executed by one or more processors, perform the recited operations. Generally, computer-executable instructions include routines, programs, objects, components, data structures, and the like that perform particular functions or implement particular abstract data types. Finally, the order in which the operations are described is not intended to be construed as a limitation, and any number of the described operations can be combined in any order and/or in parallel to implement the process.

At operation 802, a search query may be displayed on the query builder user interface. The search query may be displayed divided into segments or portions. In the context of the example of FIG. 3, the segmented search query "[apple] [juice concentrate]" is displayed within segmented search query box 318. Furthermore, the segmentation arrow 312 indicates that the search query is segmented into the two segments, "[apple]" and "[juice concentrate]".

At operation 804, a selection of a segment within the search query may be received by the query builder user interface. The user may make a selection of one of the segments of the search query. The selection of the segment may be received by the query builder user interface and shown to the user in a highlighted or grayed-out format. Again, in the context of the example of FIG. 3, the user has selected the segment "apple" of the search query, which has been illustrated as grayed-out.

At operation 806, one or more alternatives to the selected segment may be presented. The one or more alternatives are presented based upon their relationship with the selected and/or unselected segments. Again, in the context of the example of FIG. 3, the query builder user interface presents the alternatives within the substitution box 318.

At operation 808, a selection of one of the presented alternatives may be received by the query builder user interface. The user may make a selection of one of the presented alternatives and this selection is received by the query builder user interface. Again, in the context of the example of FIG. 3, the user may make a selection of one of the alternatives presented in substitution box 318. For example, the user may make a selection of the alternative "orange". This selection is then received by the query builder user interface.

Finally, at operation 810, the search query may be altered using the selected alternative to the selected segment. Altering the search query may include replacing the selected segment with the selected alternative to create a refined search query. Again, in the context of the example of FIG. 3, the search query "apple juice concentrate" may be altered by using the selected alternative "orange" to replace the selected segment "apple". This would create the refined search query of "orange juice concentrate".

Figure 9:
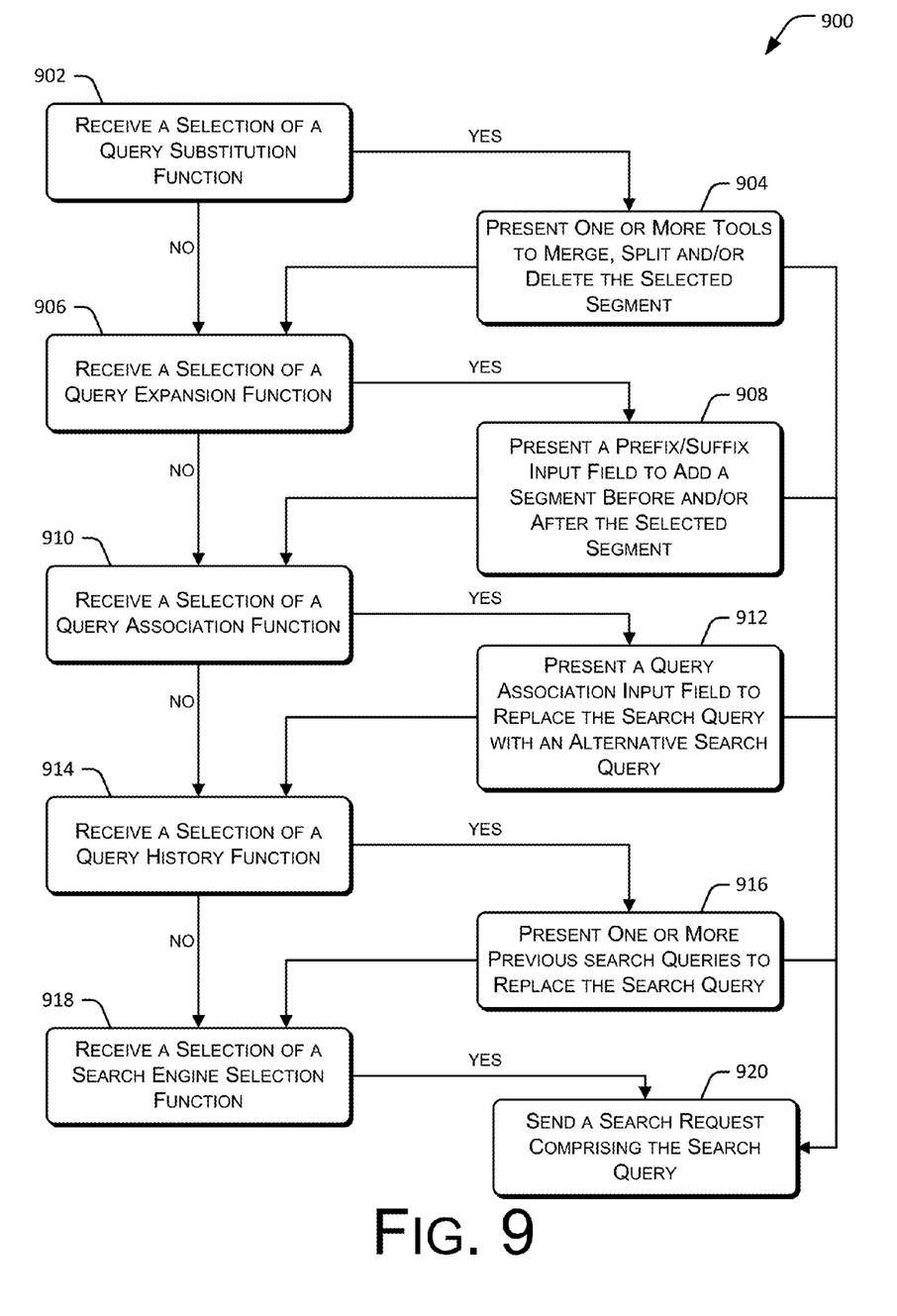
FIG. 9 is a flow diagram showing an example process for managing a plurality of query functions and query manipulation tools.

FIG. 9 illustrates an example process 900 to implement the techniques described above, including operation of a query function, such as the query substitution, expansion, association and/or history functions, to operate a user interface and provide various tools and/or input displays. Again, the order in which the operations are described is not intended to be construed as a limitation, and any number of the described operations can be combined in any order and/or in parallel to implement the process.

At operation 902, a selection of the query substitution function may be received. The selection of the query substitution function (or any other query function described in this process) may be received by processing touch input from a user on a device. In the context of the example of FIG. 3, the search query user interface may receive the input or selection of the query substitution function 314 from the user, and in response display the query substitution function as grayed-out, highlighted, or the like. The query substitution function 314 may operate to allow selection by the user of a segment within a search query and to provide a substitution box containing substitute words, terms or phrases for substitution with the selected segment.

At operation 904, if the search query user interface receives the selection at operation 902 indicating the query substitution function, one or more tools to merge, split and/or delete the selected segment may be presented. The user may utilize one or more of the tools to alter the segments of the search query. The one or more tools may be presented in the manner illustrated as the one or more tools 316 in FIGS. 2 and 7. By operating the tools, the user may better identify or define a segment of the search query for which substitutes are desired. Accordingly, the user is able to manipulate segmentation of a search query using the tools and to select a desired substitute using the query substitution function 314.

At operation 906, a selection of the query expansion function may be received. The selection of the query expansion function at operation 906 may be in addition to or alternative to receiving the selection of the query substitution function at operation 902. Furthermore, the selection of the query expansion function at operation 906 may be in addition to presenting the one or more tools to merge, split and/or delete the selected segment at operation 904. In the context of the example of FIG. 4, the selection of the query expansion function 402 is shown as grayed-out. The query expansion function 402 may operate to present the user with a listing of potential prefixes and/or suffixes to a selected segment within the search query, and to receive selections of such potential prefixes/suffixes.

At operation 908, if the search query user interface receives the selection at operation 906 indicating operation of the query expansion function, prefix/suffix input fields to receive one or more segments for inclusion before and/or after the selected segment may be presented to the user. In the context of the example in FIG. 4, the prefix/suffix input section 406 may allow the user to input a desired word or phrase for placement either before (prefix) or after (suffix) the search query or a segment of the search query.

At operation 910, a selection of the query association function may be received. In the context of the example of FIG. 5, the query association function may allow a user to replace the search query with a new related or "associated" search query. The query association function may display one or more alternative search queries to the user within the association box 504. The user may select one of the alternative search queries without the need to type or otherwise input the new related search query. If selected, the query association function 502 may be grayed-out or otherwise indicated.

At operation 912, if the search query user interface receives the selection at operation 910 indicating operation of the query association function, a query association input field to replace the search query with an alternative search query may be presented. Again, in the context of the example of FIG. 5, an association input section 506 receives input from the user including selection of a search query that is associated with the initially input search query.

At operation 914, a selection of the query history function may be received. The query history function may allow the user to select from among previous or historical search queries that include one or more segments in common with the input search query. In the context of the example in FIG. 6, the query history function is illustrated as function 602, which may be highlighted upon selection.

At operation 916, if the search query user interface receives the selection at operation 914 indicating operation of the query historical function, one or more previous search queries selectable to replace the search query may be presented. In the context of the example of FIG. 6, the one or more previous search queries may be displayed within search history box 604.

At operation 918, input to a search engine selection function may be received from the user. The search engine selection function may allow the user to select or change the search engine(s) to which the search request is sent. For example, the user may select to send the desired search query to a single preferred search engine or to multiple search engines. In the context of the example of FIG. 7, the selection of the search engine selection function 706(1)-(O) is illustrated as being a selection to send the search query "apple juice" to both Bing® and Google® search engines.

Finally at operation 920, a search request comprising the search query, as altered and refined by operations 902-916, may be sent to the search engine(s) selected at operation 918. However, if no selection is made at operation 918, the search request may be sent to the default search engine.

CONCLUSION

Although subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claimed methods, devices, systems, etc.

What is claimed is:

1. A computing device comprising:
   a screen configured for input and output; and
   a user interface displayed on the screen, the user interface comprising:
   a segmented search query box configured to:
   present a search query represented as one or more segments; and
   receive a selection of a segment of the one or more segments by processing touch input on the screen; and
   interactive functions to alter the search query or replace individual segments of the one or more segments in the search query, the interactive functions being displayed on the screen and selectable by touch input on the screen, the interactive functions comprising:
   a query substitution function that, upon selection by processing touch input on the screen, causes the user interface to present one or more alternative segments for selection to replace a selected segment of the one or more segments with a selected alternative segment of the one or more alternative segments; and
   a query expansion function that, upon selection by processing touch input on the screen, causes the user interface to present one or more additional segments for selection to be included in the search query before or after: (i) the search query, or (ii) a selected segment of the one or more segments.

2. The computing device of claim 1, wherein selection of the query substitution function further causes presentation on the user interface of one or more of:
   a selectable option to merge the selected segment with an adjacent segment of the one or more segments, wherein the one or more segments comprises a plurality of segments; or
   a selectable option to split the selected segment into multiple segments.

3. The computing device of claim 1, the interactive functions further comprising a query association function that, upon selection by processing touch input on the screen, causes the user interface to present one or more alternative search queries for selection to replace the search query with a selected alternative search query of the one or more alternative search queries.

4. The computing device of claim 1, wherein the user interface further comprises:
   a first portion containing, at least, the segmented search query box, the query substitution function, and the query expansion function;
   a second portion containing, at least, a search engine box configured to display search results of the search query; and
   a separation bar configured to manipulate a size of the first and second portions.

5. A method comprising:
   under control of a computing device configured with processor-executable instructions:
   displaying a search query, the search query divided into a plurality of segments;
   displaying a query expansion function for selection by touch input on a screen of the computing device;
   receiving a selection of the query expansion function by processing touch input received on the screen;
   displaying, in response to the selection of the query expansion function, one or more additional segments for selection by touch input on the screen;
   receiving a selection of an additional segment of the one or more additional segments by processing touch input received on the screen; and
   including, in response to the selection of the additional segment, the additional segment in the search query before or after: (i) the search query, or (ii) a segment of the plurality of segments that has been selected by touch input received on the screen.

6. The method of claim 5, further comprising:
   receiving a selection of a particular segment of the plurality of segments by processing touch input received on the screen, the method further comprising one of:
   displaying a selectable option to merge the particular segment with an adjacent segment of the plurality of segments; or
   displaying a selectable option to split the particular segment into multiple segments.

7. The method of claim 6, further comprising determining whether the particular segment includes multiple words, and wherein the displaying the selectable option to split the particular segment is contingent on determining that the particular segment includes multiple words.

8. The method of claim 5, further comprising:
   receiving a selection of a particular segment of the plurality of segments by processing touch input received on the screen;
   presenting one or more alternatives to the particular segment for selection by touch input on the screen;
   receiving a selection of an alternative of the one or more alternatives by processing touch input received on the screen; and
   replacing the particular segment with the selected alternative.

9. The method of claim 8, wherein the presenting of the one or more alternatives comprises selecting the one or more alternatives for presentation based at least in part on one or more non-selected segments of the plurality of segments, the one or more non-selected segments being indicative of an interpretation of the particular segment.

10. The method of claim 5, further comprising displaying a plurality of search engine functions for selection by touch input on the screen, wherein each search engine function is associated with one or more search engines, databases, or ecommerce merchant catalogs, the method further comprising:
    receiving a selection of a search engine function of the one or more search engine functions by processing touch input received on the screen; and
    sending, at least partly in response to the receiving the selection of the search engine function, an altered search query comprising the search query and the additional segment to an associated one of the one or more search engines, databases, or ecommerce merchant catalogs.

11. The method of claim 5, wherein the displaying the search query further comprises displaying a visual indicator between each of the plurality of segments to indicate a division between each of the plurality of segments.

12. The method of claim 5, wherein the displaying the one or more additional segments comprises displaying:
- a list of prefix words or phrases to place before (i) the search query, or (ii) the selected segment; and
- a list of suffix words or phrases to place after (i) the search query, or (ii) the selected segment.

13. One or more computer-readable storage media, storing computer-executable instructions that, when executed, configure a processor to perform acts comprising:
- displaying a search query in a format including one or more segments;
- displaying a query expansion function for selection by touch input on a screen of the computing device;
- receiving a selection of the query expansion function by processing touch input received on the screen;
- displaying, in response to the selection of the query expansion function, one or more additional segments for selection by touch input on the screen;
- receiving a selection of an additional segment of the one or more additional segments by processing touch input received on the screen; and
- including, in response to the selection of the additional segment, the additional segment in the search query before or after: (i) the search query, or (ii) a segment of the one or more segments that has been selected by touch input received on the screen.

14. The one or more computer-readable storage media of claim 13, wherein the acts further comprise:
- receiving a selection of a particular segment of the one or more segments by processing touch input received on the screen; and
- displaying a selectable option to merge the particular segment with an adjacent segment of the one or more segments, wherein the one or more segments comprises a plurality of segments; or
- displaying a selectable option to split the particular segment into multiple segments.

15. The one or more computer-readable storage media of claim 13, wherein the acts further comprise:
- receiving a selection of a particular segment of the one or more segments by processing touch input received on the screen;
- accessing, at least partly in response to the receiving the selection of the particular segment, a knowledge base to determine one or more alternative segments that relate to the particular segment; and
- displaying the one or more alternative segments for selection by touch input on the screen.

16. The one or more computer-readable storage media of claim 15, wherein the acts further comprise:
- receiving a selection of an alternative segment of the one or more alternative segments; and
- replacing the particular segment with the selected alternative segment.

17. The one or more computer-readable storage media of claim 15, wherein the one or more segments comprise a plurality of segments, and wherein the displaying the one or more alternative segments comprises selecting the one or more alternative segments for display based at least in part on one or more non-selected segments of the plurality of segments, the one or more non-selected segments being indicative of an interpretation of the particular segment.

18. The one or more computer-readable storage media of claim 13, wherein the acts further comprise:
- displaying one or more search engine functions for selection by touch input on the screen;
- receiving a selection of a search engine function of the one or more search engine functions by processing touch input received on the screen; and
- sending an altered search query comprising the search query and the additional segment to one or more search engines, databases, or ecommerce merchant catalogs associated with the selected search engine function.

19. The one or more computer-readable storage media of claim 13, wherein the acts further comprise:
- displaying search results received in response to sending an altered search query comprising the search query and the additional segment to a search engine; and
- receiving a selection of one or more operations, the one or more operations comprising at least one of:
  - an operation to share, publish, or email the search results; or
  - an operation to lock the search results to prevent additional manipulation.

20. The one or more computer-readable storage media of claim 13, wherein the one or more segments comprises a plurality of segments, and wherein the displaying the search query further comprises displaying a visual indicator between each of the plurality of segments to indicate a division between each of the plurality of segments.

* * * * *